United States Patent
Kim et al.

(10) Patent No.: US 8,665,958 B2
(45) Date of Patent: Mar. 4, 2014

(54) METHOD AND APPARATUS FOR ENCODING AND DECODING VIDEO SIGNAL USING MOTION COMPENSATION BASED ON AFFINE TRANSFORMATION

(75) Inventors: Dong Hyung Kim, Seoul (KR); Se Yoon Jeong, Daejeon (KR); Jin Soo Choi, Daejeon (KR); Won Sik Cheong, Daejeon (KR); Kyung Ae Moon, Daejeon (KR); Jin Woo Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 497 days.

(21) Appl. No.: 12/865,069

(22) PCT Filed: Jan. 29, 2009

(86) PCT No.: PCT/KR2009/000441
§ 371 (c)(1),
(2), (4) Date: Jul. 28, 2010

(87) PCT Pub. No.: WO2009/096721
PCT Pub. Date: Aug. 6, 2009

(65) Prior Publication Data
US 2010/0329347 A1 Dec. 30, 2010

(30) Foreign Application Priority Data

Jan. 29, 2008 (KR) .......... 10-2008-0009120
Jan. 29, 2009 (KR) .......... 10-2009-0007038

(51) Int. Cl.
*H04B 1/66* (2006.01)

(52) U.S. Cl.
USPC ............ 375/240.16; 375/240.15; 375/240.12; 375/240.14; 382/238; 382/236; 382/243; 382/239

(58) Field of Classification Search
USPC ............ 375/240.16, 240.15, 240.12, 240.14; 382/238, 236, 243, 239
See application file for complete search history.

(56) References Cited

U.S. PATENT DOCUMENTS 5,557,684 A  9/1996  Wang et al.
5,598,215 A * 1/1997  Watanabe .................. 348/416.1
(Continued)

FOREIGN PATENT DOCUMENTS

WO    2007/138526    12/2007

OTHER PUBLICATIONS

Kordasiewicz, et al., "Affine Motion Prediction Based on Translational Motion Vectors," IEEE Transactions on Circuits and Systems for Video Technology, vol. 17, No. 10, Oct. 2007, pp. 1388-1394.

(Continued)

*Primary Examiner* — Shawn An
(74) *Attorney, Agent, or Firm* — Staas & Halsey LLP

(57) ABSTRACT

A video encoding method and apparatus are provided. The video encoding method includes determining whether a current block includes an affine-transformation object having an affine transformation; if the current block includes an affine-transformation object, generating a prediction block by performing affine transformation-based motion compensation on the current block in consideration of an affine transformation of the affine-transformation object; and if the current block does not include any affine-transformation object, generating a prediction block by performing motion vector-based motion compensation on the current block using a motion vector of the current block. Therefore, it is possible to achieve high video encoding/decoding efficiency even when a block to be encoded or decoded includes an affine transformation.

14 Claims, 6 Drawing Sheets

(56) References Cited

U.S. PATENT DOCUMENTS

| | | | | |
|---|---|---|---|---|
| 5,970,173 A | * | 10/1999 | Lee et al. | 382/236 |
| 5,978,030 A | * | 11/1999 | Jung et al. | 375/240.16 |
| 6,208,690 B1 | * | 3/2001 | Tomizawa | 375/240.12 |
| 2002/0067864 A1 | * | 6/2002 | Matsuhira | 382/300 |
| 2003/0072373 A1 | * | 4/2003 | Sun | 375/240.16 |
| 2006/0072663 A1 | | 4/2006 | Li et al. | |

OTHER PUBLICATIONS

Wiegand, et al., "Affine Multipicture Motion-Compensated Prediction," IEEE Transactions on Circuits and Systems for Video Technology, vol. 15, No. 2, Feb. 2005, pp. 197-209.

International Search Report issued Aug. 31, 2009 in correspond International Application No. PCT/KR2009/000441.

* cited by examiner

METHOD AND APPARATUS FOR ENCODING AND DECODING VIDEO SIGNAL USING MOTION COMPENSATION BASED ON AFFINE TRANSFORMATION

CROSS REFERENCE TO RELATED APPLICATIONS

This application claims the benefit of International Application No. PCT/KR2009/000441, filed Jan. 29, 2009, and claims the benefit of Korean Application No. 10-2009-0007038, filed Jan. 29, 2009, and Korean Application No. 10-2008-0009120, filed Jan. 29, 2008, the disclosures of all of which are incorporated herein by reference.

TECHNICAL FIELD

The present invention relates to a video encoding method and apparatus and a video decoding method and apparatus in which a video signal can be encoded through affine transformation-based motion compensation.

The present invention is based on research (Project Management No.: 2007-S-004-01, Project Title: Development of Rich Media Broadcasting Technology through Advancement of AV codec) conducted as part of Information Technology (IT) Growth Power Technology Development Project launched by Ministry of Information and Communication and Institute for Information Technology Advancement (IITA).

BACKGROUND ART

Inter-frame encoding such as H.264 video encoding is similar to other various video encoding methods in terms of predicting a current block through block-oriented motion estimation and encoding the predicted current block. However, inter-frame encoding is differentiated from other various video encoding methods by using various macroblock modes and adopting different block sizes for the various macroblock modes so as to perform motion estimation and motion compensation. Inter-frame encoding generally includes performing motion estimation in each of the various macroblock modes, choosing whichever of the various macroblock modes is determined to be optimal in consideration of rate-distortion performance, and encoding a prediction error in the chosen macroblock mode, i.e., the difference(s) between a current block and a block obtained by performing motion estimation on the current block.

In inter-frame encoding, like in other various video encoding methods, motion estimation and motion compensation are performed only in consideration of horizontal and vertical translational motion components. That is, referring to FIG. 1, motion estimation and motion compensation may be performed on a current block only in consideration of horizontal and vertical motions ($mv_x$ and $mv_y$) with respect to a reference frame.

If motion estimation and motion compensation are performed only in consideration of horizontal and/or vertical motions, coding complexity may decrease, but it may not be able to achieve high encoding efficiency especially when an object in a picture to be encoded has an affine transformation such as rotation, enlargement or reduction. On the other hand, if motion estimation and motion compensation are performed in consideration of all possible transformations of an object, encoding efficiency may increase, but coding complexity, and particularly, the complexity of motion estimation, may considerably increase.

DISCLOSURE OF INVENTION

Technical Problem

The present invention provides a video encoding method and apparatus and a video decoding method and apparatus which can achieve high encoding efficiency even when a block to be encoded includes an affine-transformation object having an affine transformation such as rotation, enlargement or reduction.

Solution to Problem

According to an aspect of the present invention, there is provided a video encoding method including determining whether a current block includes an affine-transformation object having an affine transformation; if the current block includes an affine-transformation object, generating a prediction block by performing affine transformation-based motion compensation on the current block in consideration of an affine transformation of the affine-transformation object; and if the current block does not include any affine-transformation object, generating a prediction block by performing motion vector-based motion compensation on the current block using a motion vector of the current block.

According to another aspect of the present invention, there is provided a video encoding apparatus including a motion estimation unit calculating a motion vector of a current block with reference to a reference block; an affine-transformation object calculation unit determining whether a current block to be subjected to motion compensation includes an affine-transformation object having an affine transformation and outputting an affine-transformation object detection signal corresponding to the results of the determination; and a motion compensation unit generating a prediction block by performing either affine transformation-based motion compensation or motion vector-based motion compensation on the current block in response to the affine-transformation object detection signal.

According to another aspect of the present invention, there is provided a video decoding method including determining whether an affine-transformation object exists in a reference block; if an affine-transformation object exists in the reference block, generating a predicted block by performing affine transformation-based motion compensation on the reference block; and if no affine-transformation object exists in the reference block, generating the predicted block by performing motion vector-based motion compensation on the reference block.

According to another aspect of the present invention, there is provided a video decoding apparatus including an affine-transformation object detection unit determining whether an affine-transformation object exists in a reference block and outputting a signal indicating the results of the determination; a motion compensation unit generating a predicted block by performing one of affine transformation-based motion compensation and motion vector-based motion compensation on the reference block in response to the signal output by the affine-transformation object detection unit; and an adding unit which generates a current block by adding the predicted block and a residual signal.

According to another aspect of the present invention, there is provided a computer-readable recording medium having recorded thereon a program for executing a video encoding method including determining whether a current block includes an affine-transformation object having an affine transformation; if the current block includes an affine-transformation object, generating a prediction block by performing affine transformation-based motion compensation on the current block in consideration of an affine transformation of the affine-transformation object; and if the current block does not include any affine-transformation object, generating a prediction block by performing motion vector-based motion compensation on the current block using a motion vector of the current block.

According to another aspect of the present invention, there is provided a computer-readable recording medium having recorded thereon a program for executing a video decoding method including determining whether an affine-transformation object exists in a reference block; if an affine-transformation object exists in the reference block, generating a predicted block by performing affine transformation-based motion compensation on the reference block; and if no affine-transformation object exists in the reference block, generating the predicted block by performing motion vector-based motion compensation on the reference block.

Advantageous Effects of Invention

According to the present invention, affine transformation-based motion estimation/compensation may be performed on each block including an affine-transformation object having an affine transformation. Thus, it is possible to overcome the shortcomings of conventional video encoding and decoding methods in which motion estimation and motion compensation prediction are preformed in units of blocks only in consideration of translational motions. Therefore, it is possible to prevent the performance of encoding from deteriorating even when an object in a block to be encoded rotates, the size or shape of the object changes or there is camera movement.

In addition, according to the present invention, it is possible to establish an affine model only based on the motion in a previously-encoded macroblock. Thus, the present invention can be readily applied to an encoding apparatus (such as an H.264 encoding apparatus) performing encoding in units of macroblocks.

BEST MODE FOR CARRYING OUT THE INVENTION

The present invention will hereinafter be described more fully with reference to the accompanying drawings, in which exemplary embodiments of the invention are shown.

Figure 1:
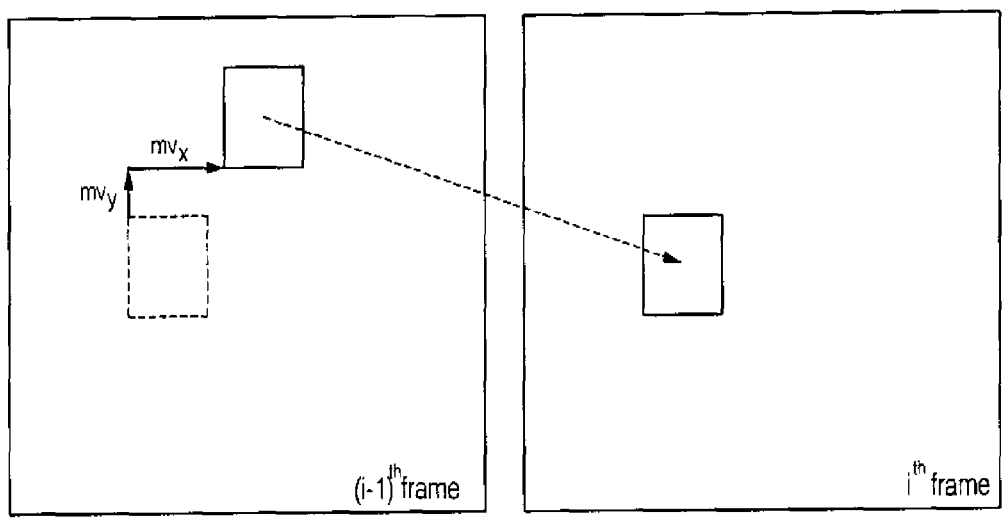
FIG. 1 illustrates a diagram for explaining conventional motion estimation and compensation methods in which only horizontal and vertical translational motions are considered.
Figure 2:
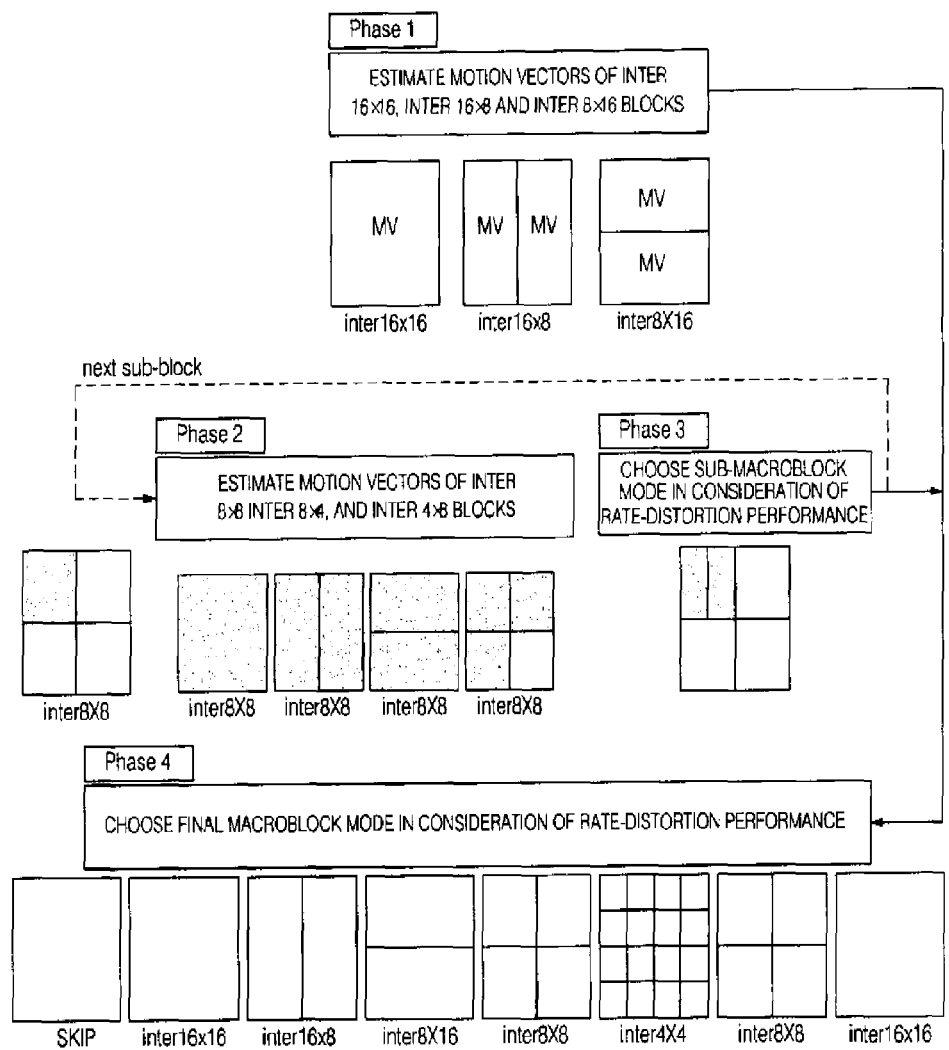
FIG. 2 illustrates a diagram for explaining a typical inter-frame encoding method.

FIG. 2 illustrates a diagram for explaining a typical inter-frame encoding method. Referring to FIG. 2, the typical inter-frame encoding method may largely involve four phases: Phases 1 through 4.

Phases 1 and 2 may be phases for estimating motion. More specifically, in phase 1, a motion vector for each of an inter 16×16 block, inter 16×8 blocks, inter 8×16 blocks may be estimated. In phase 2, a motion vector for each of a plurality of sub-blocks of an inter 8×8 block, i.e., a motion vector for each of an inter 8×8 block, inter 8×4 blocks, inter 4×8 blocks, and inter 4×4 blocks may be estimated.

In phase 3, a sub-macroblock mode may be chosen for a sub-macroblock in an inter 8×8 macroblock by using a rate-distortion function. The rate-distortion function may be represented by Equation (1):

$$RD\cos t = \text{Distortion} + \lambda \cdot \text{Rate} \quad (1)$$

where Rate indicates a bitrate used to encode side information such as a prediction error (i.e., the differences between a block currently being encoded and a restored block obtained by compensation using a motion vector of the current block) and a motion vector and Distortion indicates the sum of the squares of the differences between the current block and the restored block.

In phase 4, an optimum macroblock mode may be chosen from all macroblock modes available, including a skip mode and an intra macroblock mode, in consideration of rate-distortion performance.

In video encoding and decoding methods according to the present invention, unlike in the typical inter-frame encoding method, affine transformation-based motion compensation may be applied only to phases 3 and 4 in consideration of coding complexity. That is, in the video encoding and decoding methods according to the present invention, only horizontal and vertical translational motions may be taken into consideration during the estimation of a motion vector, and affine transformation-based motion compensation, in which the rotation, enlargement or reduction of an object is considered, may be performed in the phase of motion compensation. Therefore, it is possible to minimize coding complexity and provide high encoding efficiency.

More specifically, in the video encoding and decoding methods according to the present invention, affine transformation-based motion compensation may be performed only on blocks that are believed to include affine transformations such as rotation, enlargement and reduction. Thus, it is possible to minimize coding complexity. In addition, the video encoding and decoding methods according to the present invention suggest ways to skip an inverse matrix calculation process for deducing an affine model from blocks to be subjected to affine transformation-based motion compensation. Therefore, it is possible to achieve high encoding efficiency with less computation.

Figure 3:
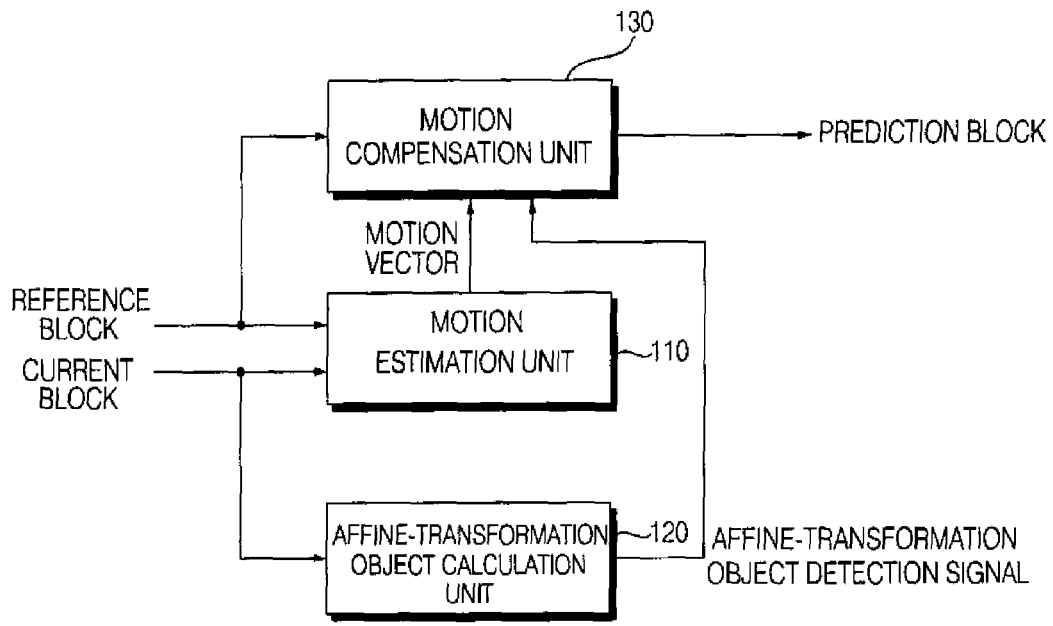
FIG. 3 illustrates a block diagram of a video encoding apparatus according to an exemplary embodiment of the present invention.

FIG. 3 illustrates a block diagram of a video encoding apparatus according to an exemplary embodiment of the present invention. Referring to FIG. 3, the video encoding apparatus may include a motion estimation unit 110, an affine-transformation object calculation unit 120 and a motion compensation unit 130.

The motion estimation unit 110 may calculate a motion vector of a current block based on a reference block. The affine-transformation object calculation unit 120 may determine whether the current block includes an affine-transformation object. The motion compensation unit 130 may generate a prediction block by compensating for the current block based on an affine-object-detection signal provided by the affine-transformation object calculation unit 120 or the motion vector provided by the motion estimation unit 110. The video encoding apparatus may also include an encoding unit (not shown) generating a bitstream by encoding a differential signal generated based on the difference(s) between the current block and the prediction block and a signal including side information such as the motion vector of the current block.

Figure 4:
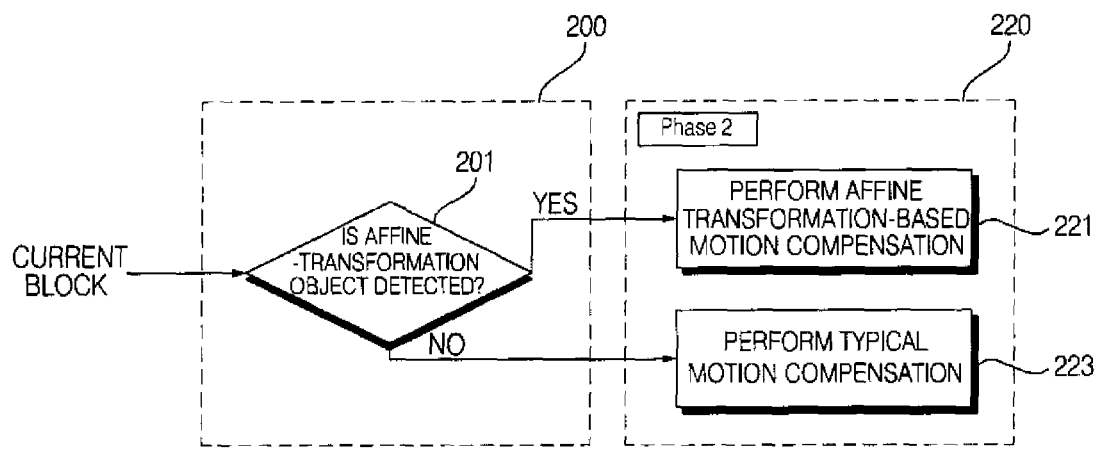
FIG. 4 illustrates a diagram for explaining a video encoding method according to an exemplary embodiment of the present invention.

FIG. 4 illustrates a diagram for explaining a video encoding method according to an exemplary embodiment of the present invention. Referring to FIG. 4, the video encoding method may be largely divided into two phases: phases 1 and 2 (200 and 220). In phase 1 (200), the affine-transformation object calculation unit 120 may determine whether a current block includes an affine-transformation object. Phase 2 (220) may involve compensating for the current block through affine transformation-based motion compensation using information such as the motion vectors of blocks adjacent to the current block (221) if it is determined in phase 1 that the current block includes an affine-transformation object; and performing typical motion compensation on the current block (223) if it is determined in phase 1 that the current block does not include any affine-transformation object.

More specifically, phase 1 (200) may involve determining whether the current block includes an affine-transformation object having an affine transformation based on the motion vector of the current block and the motion vectors of blocks adjacent to the current block, a reference frame and macroblock mode information used to encode the current block.

There are two conditions for determining whether the current block includes any affine-transformation object: if the maximum of the angles between the motion vector of the current block and the motion vectors of blocks adjacent to the current block is within a predefined range; and if a maximum variation obtained by applying affine transformation-based motion compensation is less than a reference value. If the current block satisfies neither the first nor second condition, the current block may not be subjected to affine transformation-based motion compensation.

Even if the current block includes an affine-transformation object, the current block may not be subjected to affine transformation-based motion compensation if at least one of the blocks adjacent to the current block is intra-encoded, if the current block is located on the upper left corner of a corresponding frame or if the current block references a different reference frame from the blocks adjacent to the current block.

In short, it may be determined whether the current block includes an affine-transformation object based on the first and second conditions. Thereafter, it may be determined whether to apply typical motion compensation or affine transformation-based motion compensation to the current block based on whether the current block includes an affine-transformation object.

In the exemplary embodiment of FIG. 4, video encoding or decoding may be performed in units of 8×8 blocks. If it is determined in phase 1 that the current block has an affine-transformation object, affine transformation-based motion compensation may be performed on the current block by using only the motion vectors within a range that establishes causality. Therefore, it is possible to address the problems associated with two-pass coding such as high coding complexity.

Figure 5:
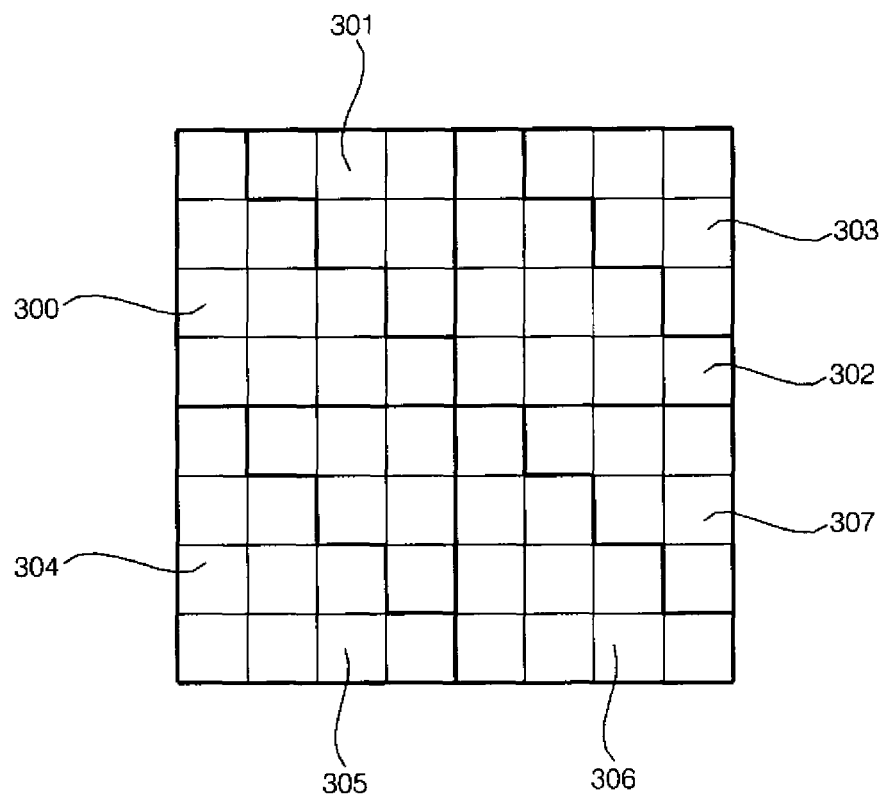
FIG. 5 illustrates a diagram for explaining how to divide an 8×8 block into eight triangular blocks.

Referring to FIG. 5, an 8×8 block may be divided into eight triangular blocks 300 through 307. The triangular blocks 300 through 307 may be motion-compensated using different affine models.

Figure 6:
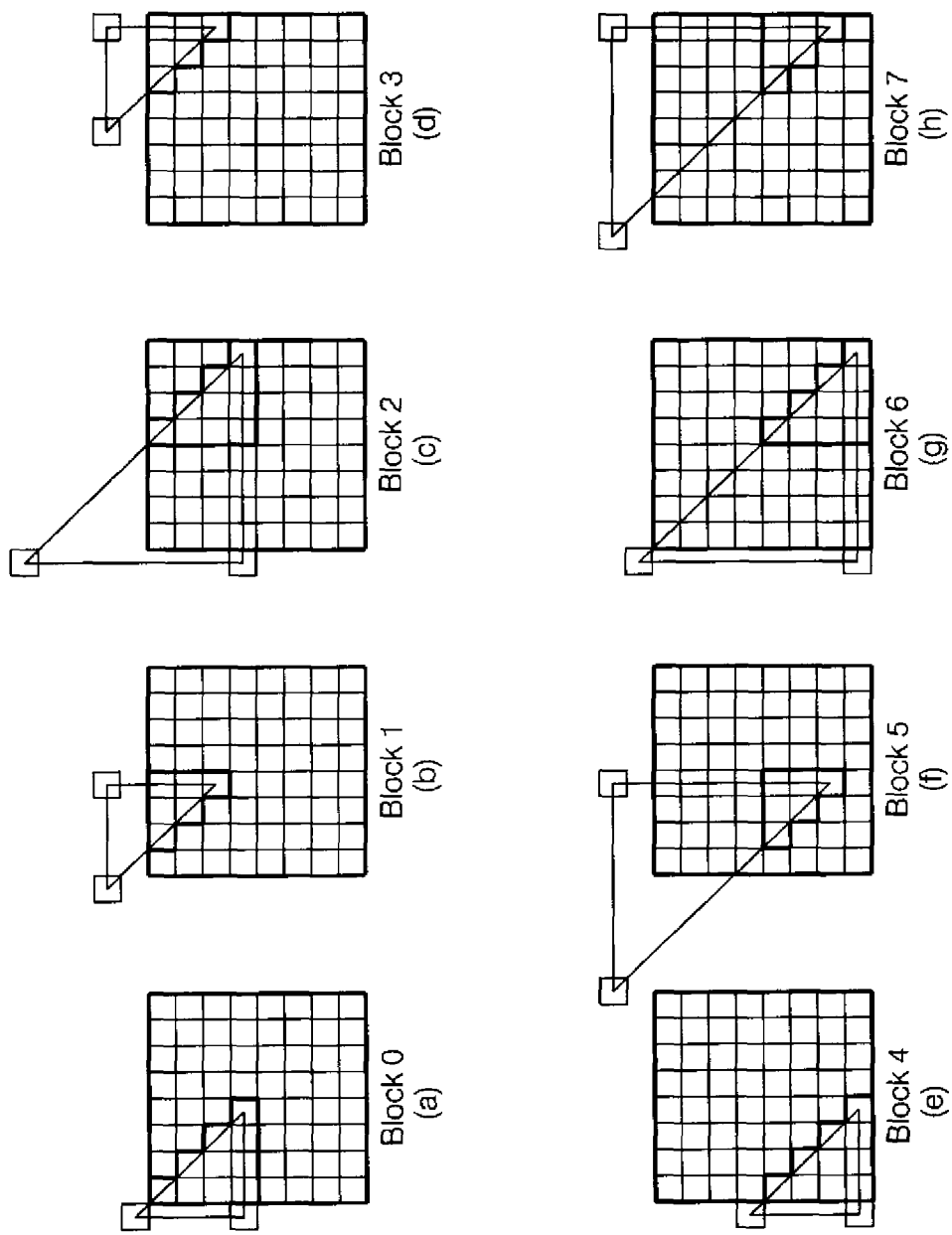
FIG. 6 illustrates a diagram for explaining motion vectors used to deduce an affine transformation at each of a plurality of triangular blocks in an 8×8 block.

FIG. 6 illustrates motion vectors used to deduce an affine model for each of a plurality of triangular blocks in an 8×8 block. Referring to FIG. 6, the affine model for each of a plurality of triangular blocks (i.e., blocks 0 through 7) in a current (8×8) block may vary according to a macroblock mode of the current block and a macroblock mode of a number of blocks adjacent to the current block. If the current block is located at the lower right corner of a macroblock and the macroblock mode of the current block is a 16×16 mode, the motion vectors of blocks 0 through 7 may all be the same. The affine models for blocks 0 through 7 may all include translations only and may thus have the same model formula.

An affine transformation formula between (x,y) and (x', y') may be represented by Equation (2):

$$\begin{bmatrix} x' \\ y' \\ 1 \end{bmatrix} = \begin{bmatrix} a & b & c \\ d & e & f \\ 0 & 0 & 1 \end{bmatrix} \begin{bmatrix} x \\ y \\ 1 \end{bmatrix}. \quad (2)$$

A total of six equations may be required to determine the values of parameters a, b, c, d, e and f in Equation (2). For this, at least three displacement values for (x, y) may be required. If there are more than three displacement values, a least square solution may be used to determine the values of parameters a, b, c, d, e and f in Equation (2). If (x0, y0), (x1, y1), (x2, y2), (x'0, y'0), (x'1, y'1), and (x'2, y'2) are provided as displacement values for (x, y), the values of the parameters a, b, c, d, e and f may be determined using Equations (3):

$$p^T = A^{-1} \cdot b^T \quad (3)$$

where $$A = \begin{bmatrix} x_0 & y_0 & 1 & 0 & 0 & 0 \\ x_1 & y_1 & 1 & 0 & 0 & 0 \\ x_2 & y_2 & 1 & 0 & 0 & 0 \\ 0 & 0 & 0 & x_0 & y_0 & 1 \\ 0 & 0 & 0 & x_1 & y_1 & 1 \\ 0 & 0 & 0 & x_2 & y_2 & 1 \end{bmatrix}$$

$$p = [\, a \quad b \quad c \quad d \quad e \quad f \,]$$

$$b = [\, x'_0 \quad x'_1 \quad x'_2 \quad y'_0 \quad y'_1 \quad y'_2 \,].$$

In the video encoding and decoding methods according to the present invention, an affine model for each of a plurality of triangular blocks in an 8×8 block may be deduced using variations at the apexes of each of the triangular blocks. Referring to Equations (3), there is no need to calculate the inverse matrix of matrix A, i.e., $A^{-1}$, because the inverse 6×6 matrix $A^{-1}$ can be easily obtained from eight inverse matrices respectively corresponding to blocks 0 through 7, which are all calculated in advance. Thus, it is possible to reduce coding complexity.

Figure 7:
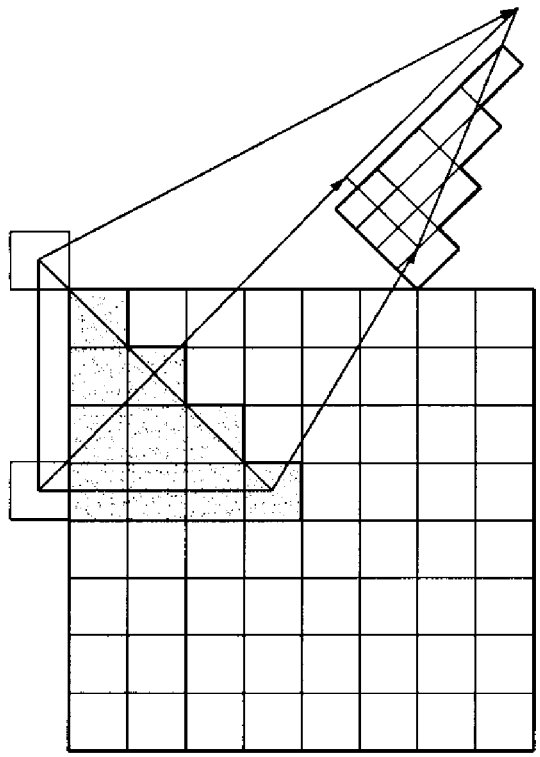
FIGS. 7 and 8 illustrate diagrams for affine transformations that can be used in the present invention.
Figure 8:
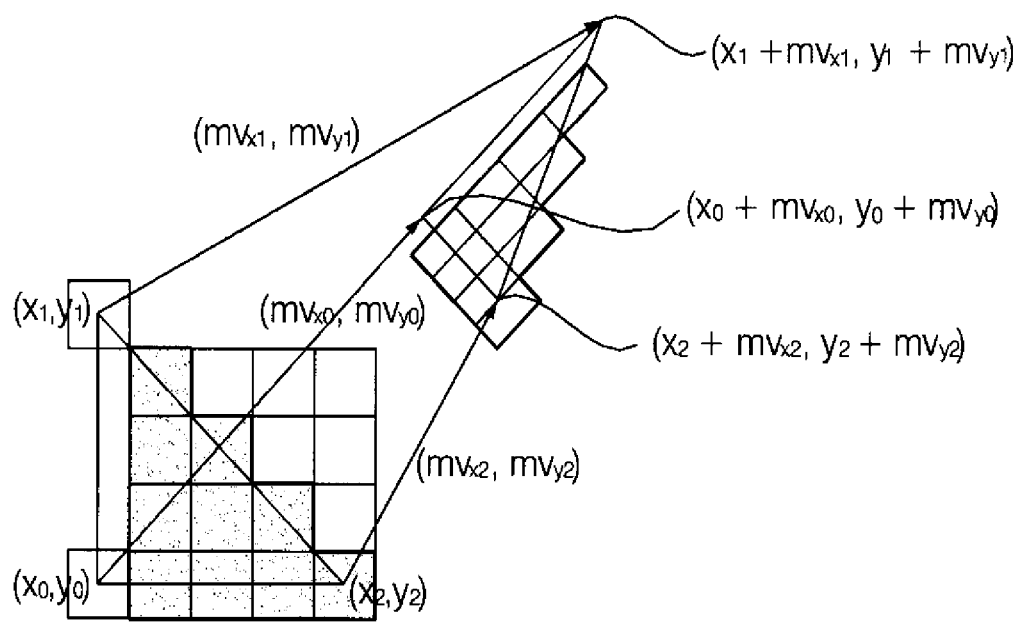

FIG. 7 illustrates the case in which a current block to be encoded includes an object which is reduced by ½ with respect to the vertical axis of a previous frame and is inclined to the right at an angle of 45 degrees.

Three points of displacement for obtaining an affine model for block 0 of a current block are $(x_0, y_0) \rightarrow (x_0 + mv_{x0}, y_0 + mv_{y0})$, $(x_1, y_1) \rightarrow (x_1 + mv_{x1}, y_1 + mv_{y1})$, and $(x_2, y_2) \rightarrow (x_2 + mv_{x2}, y_2 + mv_{y2})$. According to existing video encoding standards as H.264, the minimum size of macroblocks that can have a motion vector is 4×4. Therefore, motion vectors mvx0 through mvx2 may be different from one another. However, assume that all 4×4 blocks in the current block have the same motion vector if the minimum size of macroblocks that can have a motion vector is 4×4 in blocks adjacent to the current block.

An affine model for block 0 may be obtained using the three points of displacement, as indicated by Equations (4):

$$p^T = A^{-1} \cdot b^T \qquad (4)$$

where $$A = \begin{bmatrix} x_0 & y_0 & 1 & 0 & 0 & 0 \\ x_1 & y_1 & 1 & 0 & 0 & 0 \\ x_2 & y_2 & 1 & 0 & 0 & 0 \\ 0 & 0 & 0 & x_0 & y_0 & 1 \\ 0 & 0 & 0 & x_1 & y_1 & 1 \\ 0 & 0 & 0 & x_2 & y_2 & 1 \end{bmatrix}$$

$$p = [\, a \quad b \quad c \quad d \quad e \quad f \,]$$

$$b = [mv_{x0}\ x_1 + mv_{x1}\ x_2 + mv_{x2}\ y_0 + mv_{y0}\ y_1 + mv_{y1}\ y_2 + mv_{y2}].$$

Referring to Equations (4), matrix A includes the coordinates of the current block and the coordinates of each of the blocks adjacent to the current block. If the point $(x_0,y_0)$ is mapped to the origin (0,0), matrix A can be commonly applied to blocks 0 through 7 regardless of the position of the current block in a corresponding macroblock.

Equations (4) may be transformed into Equations (5), and Equations (6) may be obtained by applying (x1,y1) to Equations (5). Equations (5) and Equations (6) are as follows:

$$p^T = A^{-1} \cdot b^T \qquad (5)$$

where $$A = \begin{bmatrix} 0 & 0 & 1 & 0 & 0 & 0 \\ 0 & -16 & 1 & 0 & 0 & 0 \\ 16 & 0 & 1 & 0 & 0 & 0 \\ 0 & 0 & 0 & 0 & 0 & 1 \\ 0 & 0 & 0 & 0 & -16 & 1 \\ 0 & 0 & 0 & 16 & 0 & 1 \end{bmatrix}$$

$$p = [\, a \quad b \quad c \quad d \quad e \quad f \,]$$

$$b = [\, mv_{x0} \quad mv_{x1} \quad mv_{x2} + 16 \quad mv_{y0} \quad y_1 - 16 \quad mv_{y2} \,];\ \text{and}$$

$$p^T = B \cdot b^T$$

where (6)

$$B = \frac{1}{16} \cdot \begin{bmatrix} -1 & 0 & 1 & 0 & 0 & 0 \\ 1 & -1 & 0 & 0 & 0 & 0 \\ 16 & 0 & 0 & 0 & 0 & 0 \\ 0 & 0 & 0 & -1 & 0 & 1 \\ 0 & 0 & 0 & 1 & -1 & 0 \\ 0 & 0 & 0 & 16 & 0 & 0 \end{bmatrix}$$

$$p = [\, a \quad b \quad c \quad d \quad e \quad f \,]$$

$$b = [\, mv_{x0} \quad mv_{x1} \quad mv_{x2} + 16 \quad mv_{y0} \quad y_1 - 16 \quad mv_{y2} \,].$$

According to the H.264 standard, motion estimation may be performed in units of ¼ pixels, and thus, the distance between a pair of adjacent pixels may be 4. Therefore, if a pixel at a point (4,−12) is determined to have been moved to $(4+mv_{x2}+\Delta x, -12+mv_{y2}+\Delta y)$ based on an affine model, the pixel may be determined to have the same displacement ($\Delta x$, $\Delta y$) at any arbitrary block location. This is very important for the reduction of computation because, according to the present invention, it is possible to easily obtain an affine model simply using eight inverse matrices respectively corresponding to blocks 0 through 7 without the need to calculate the inverse matrix of matrix A.

An affine model for each of blocks 1 through 7 may be obtained using the same method used to obtain the affine model for block 0.

Once the affine models for blocks 1 through 7 are all obtained, motion compensation may be performed on the current block, as indicated by Equation (7):

$$x'=\text{round}(ax+by+c)$$

$$y'=\text{round}(dx+ey+f) \qquad (7)$$

In short, if a current block includes an affine-transformation object, affine transformation-based motion compensation may be performed on the current block, thereby maintaining high encoding efficiency.

A video decoding method according to an exemplary embodiment of the present invention may be performed by inversely performing the above-mentioned video encoding method. That is, it may be determined whether an affine-transformation object exists in a reference block. Thereafter, if an affine-transformation object exists in the reference block, a predicted block may be generated by performing affine transformation-based motion compensation on the reference block. On the other hand, if no affine-transformation object exists in the reference block, a predicted block may be generated by performing motion vector-based motion compensation on the reference block. Thereafter, a current block may be generated using a predicted block and a residual signal included in a video signal to be decoded. Therefore, a video decoding apparatus according to an exemplary embodiment of the present invention, unlike a typical video decoding apparatus, may include an affine-transformation object calculation unit determining whether an affine-transformation object exists in the reference block.

The video encoding and decoding methods according to the present invention are not restricted to the exemplary embodiments set forth herein. Therefore, variations and combinations of the exemplary embodiments set forth herein may fall within the scope of the present invention.

The present invention can be realized as computer-readable code written on a computer-readable recording medium. The computer-readable recording medium may be any type of recording device in which data is stored in a computer-readable manner Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The present invention can be effectively applied to the encoding or decoding of a video signal and can thus achieve high efficiency especially when a block to be encoded includes an affine-transformation object having an affine transformation such as rotation, enlargement or reduction.

The invention claimed is:

1. A video encoding method, comprising:
   determining whether a current block includes an affine-transformation object having an affine transformation based on a comparison of a motion vector of the current block and a motion vector of blocks adjacent to the current block;
   when the current block includes an affine-transformation object, generating a prediction block by performing affine transformation-based motion compensation on the current block in consideration of an affine transformation of the affine-transformation object; and
   when the current block does not include any affine-transformation object, generating a prediction block by performing motion vector-based motion compensation on the current block using the motion vector of the current block.

2. The video encoding method of claim 1, further comprising generating a differential signal based on a difference between the current block and the prediction block.

3. The video encoding method of claim 2, further comprising generating a bitstream including data obtained by encoding the differential signal.

4. The video encoding method of claim 1, further comprising calculating the motion vector of the current block with reference to a reference block.

5. The video encoding method of claim 1, further comprising, if the current block includes an affine-transformation object and is located on the upper left corner of a frame, performing affine transformation-based motion compensation on the current block.

6. The video encoding method of claim 1, wherein the performing of affine transformation-based motion compensation comprises dividing the current block into a number of triangular blocks and applying different affine models to the triangular blocks.

7. A video encoding apparatus comprising:
   a motion estimation unit calculating a motion vector of a current block with reference to a reference block;
   an affine-transformation object calculation unit determining whether a current block to be subjected to motion compensation includes an affine-transformation object having an affine transformation based on a comparison of the motion vector of the current block and a motion vector of blocks adjacent to the current block, and outputting an affine-transformation object detection signal corresponding to the results of the determination; and
   a motion compensation unit generating a prediction block by performing either affine transformation-based motion compensation or motion vector-based motion compensation on the current block in response to the affine-transformation object detection signal.

8. The video encoding apparatus of claim 7, further comprising a differential unit generating a differential signal based on a difference between the current block and the prediction block.

9. The video encoding apparatus of claim 8, further comprising an encoding unit generating a bitstream including data obtained by encoding the differential signal.

10. A video encoding method comprising:
    determining whether a current block includes an affine-transformation object having an affine transformation;
    if the current block includes an affine-transformation object, generating a prediction block by performing affine transformation-based motion compensation on the current block in consideration of an affine transformation of the affine-transformation object;
    if the current block does not include any affine-transformation object, generating a prediction block by performing motion vector-based motion compensation on the current block using a motion vector of the current block; and
    if the current block includes an affine-transformation object, one of a number of blocks adjacent to the current block is intra-encoded, and the current block references a different reference block from the adjacent blocks, performing motion vector-based motion compensation on the current block.

11. A video encoding method comprising:
    determining whether a current block includes an affine-transformation object having an affine transformation;
    if the current block includes an affine-transformation object, generating a prediction block by performing affine transformation-based motion compensation on the current block in consideration of an affine transformation of the affine-transformation object;
    if the current block does not include any affine-transformation object, generating a prediction block by performing motion vector-based motion compensation on the current block using a motion vector of the current block; and
    if the current block includes an affine-transformation object and a maximum of the angles between the motion vector of the current block and the motion vectors of a number of blocks adjacent to the current block is greater than a reference value, performing motion vector-based motion compensation on the current block.

12. A video encoding method comprising:
    determining whether a current block includes an affine-transformation object having an affine transformation;
    if the current block includes an affine-transformation object, generating a prediction block by performing affine transformation-based motion compensation on the current block in consideration of an affine transformation of the affine-transformation object;
    if the current block does not include any affine-transformation object, generating a prediction block by performing motion vector-based motion compensation on the current block using a motion vector of the current block; and
    if the current block includes an affine-transformation object and a maximum variation of the affine-transformation object is greater than a reference value, performing motion vector-based motion compensation on the current block.

13. A non-transitory computer-readable recording medium having recorded thereon a computer program for executing a video encoding method comprising:
    determining whether a current block includes an affine-transformation object having an affine transformation based on a comparison of a motion vector of the current block and a motion vector of blocks adjacent to the current block;
    when the current block includes an affine-transformation object, generating a prediction block by performing affine transformation-based motion compensation on the current block in consideration of an affine transformation of the affine-transformation object; and
    when the current block does not include any affine-transformation object, generating a prediction block by performing motion vector-based motion compensation on the current block using the motion vector of the current block.

14. A video encoding method comprising;

determining whether a current block includes an affine-transformation object having an affine transformation;

if the current block includes an affine-transformation object, generating a prediction block by performing affine transformation-based motion compensation on the current block in consideration of an affine transformation of the affine-transformation object;

if the current block does not include any affine-transformation object, generating a prediction block by performing motion vector-based motion compensation on the current block using a motion vector of the current block, wherein the current block includes the affine-transformation object having the affine transformation when the a maximum of angles between the motion vector of the current block and the motion vector of blocks adjacent to the current block is within a predetermined range, and when a maximum variation obtained by applying the affine transformation-based motion compensation is less than a reference value.

\* \* \* \* \*